United States Patent [19]

Promeyrat

[11] 4,313,368
[45] Feb. 2, 1982

[54] RECIPROCATING PISTON

[75] Inventor: Maurice Promeyrat, Sevran, France

[73] Assignee: Societe Civile Promeyrat-Casteilla, Gagny, France

[21] Appl. No.: 39,808

[22] Filed: May 17, 1979

[30] Foreign Application Priority Data

Jun. 1, 1978 [FR] France .................. 78 16444

[51] Int. Cl.³ .............................. F16J 1/02; F16J 1/08
[52] U.S. Cl. .......................................... 92/159; 92/158; 277/24
[58] Field of Search ................. 92/158, 159, 162, 182, 92/223, 192; 123/193 P, 4, 136, 137

[56] References Cited

U.S. PATENT DOCUMENTS

| | | | |
|---|---|---|---|
| 1,790,767 | 2/1931 | Ricardo | 277/24 |
| 1,860,025 | 5/1932 | Good | 277/136 |
| 2,349,918 | 5/1944 | Starr | 277/24 |
| 2,400,109 | 5/1946 | Ernst | 277/24 |
| 2,481,553 | 9/1949 | Williams | 277/136 |
| 3,396,976 | 8/1968 | Reinhoudt | 92/162 R |
| 3,721,163 | 3/1973 | Hill et al. | 92/158 |
| 4,048,975 | 9/1977 | Urquhart | 92/158 |
| 4,086,844 | 5/1978 | Homuth | 92/159 |
| 4,230,027 | 10/1980 | Promeyrat | 92/159 |

FOREIGN PATENT DOCUMENTS 752329   7/1956   United Kingdom ................. 92/158

Primary Examiner—Irwin C. Cohen
Attorney, Agent, or Firm—McAulay, Fields, Fisher, Goldstein & Nissen

[57] ABSTRACT

A reciprocating piston used in particular in heat engines and other industrial machines comprises at least one decompression chamber delimited between the bottom of an annular groove and the inner face of the first ring housed in this groove. A split ring of small cross section is movable in this decompression chamber. Additionally the upper bead of the piston presents on its periphery projecting parts and recessed parts, the projecting parts having an initial deameter, before running-in, such that the diametrical clearance when cold, between the periphery of the bead and the bore of the cylinder in which the piston is housed, is substantially equal to half the corresponding usual clearance between conventional upper bead and cylinder.

6 Claims, 3 Drawing Figures

RECIPROCATING PISTON

BACKGROUND OF THE INVENTION

The present invention relates to improvements in or relating to reciprocating pistons used in particular in heat engines and other industrial machines.

Heretofore known reciprocating pistons have a lateral surface or a periphery of the at least first bead which is smooth or more generally threaded more or less deeply with a view in particular to retain oil for facilitating the slide. These pistons also comprise a first ring which is housed in an annular groove of the first bead of the piston.

These known pistons present a certain number of drawbacks which are finally translated by a reduced life and a poor yield of the engine in which they are used. In fact, the piston is not balanced due to the too large clearance existing between its bead and the bore of the cylinder in which it slides, and it is subjected to considerable, harmful oscillations during usage. The friction of the piston is, in fact, for a major part, that of the first ring which is subjected, on its inner face, to a very high pressure produced by the driving fluids which are engaged in the chamber delimited between this inner face and the bottom of the groove in which the ring is housed. Furthermore, as the duration of service of an engine increases, deposits of carbon are formed on the inner face of the ring and in the bottom of the groove receiving it. This carbon may provoke, particularly during the greatest expansions of the pistons, the jamming of each ring between these walls, thus bringing about a deterioration at these rings and consequently a loss of yield of the engine and a limitation of the life of the piston.

SUMMARY OF THE INVENTION

It is an object of the present invention to remedy these drawbacks by providing a piston of particularly simple design, of very long life and ensuring an excellent yield for the engine in which it is used.

To this end, this reciprocating piston, particularly for heat engine compressors and other industrial machines, is characterised in that is comprises, in combination, on the one hand at least one decompression chamber delimited between the bottom of an annular groove and the inner face of the first ring housed in this groove, and a piece movable in this decompression chamber, constituted by a split ring of small cross section, to maintain constant the volume of this chamber by opposing the formation of carbon, and on the other hand at least one upper bead presenting on its periphery projecting parts and recessed parts, the projecting parts having an initial diameter, before running-in, such that the diametrical clearance when cold, between the periphery of the bead and the bore of the cylinder in which the piston is housed, is substantially equal to half the corresponding usual clearance between conventional upper bead and cylinder, so that during running-in, the projecting parts of the upper bead, pressed against the inner wall of the cylinder, particularly during the greatest expansions of the piston, may contract, the recessed parts absorbing, by lubricating them with the driving fluids that they retain, the compressions or upsettings of said projecting parts.

The piston according to the invention offers the following advantages: fewer stresses of the driving fluids at ring level, better equilibrium of the piston, absence of undesirable carbon and decompression to the rear of the rings. The piston according to the invention further enables any risk of "gumming" and jamming of the rings and the risks of seizure of the skirt of the piston, the reductions in yield and the various deteriorations, to be avoided. All these advantages are finally shown in an improved yield and a clearly increased life of the piston according to the invention.

BRIEF DESCRIPTION OF THE DRAWINGS

The invention will be more readily understood on reading the following description with reference to the accompanying drawings, in which.

DESCRIPTION OF THE PREFERRED EMBODIMENT

Figure 1:
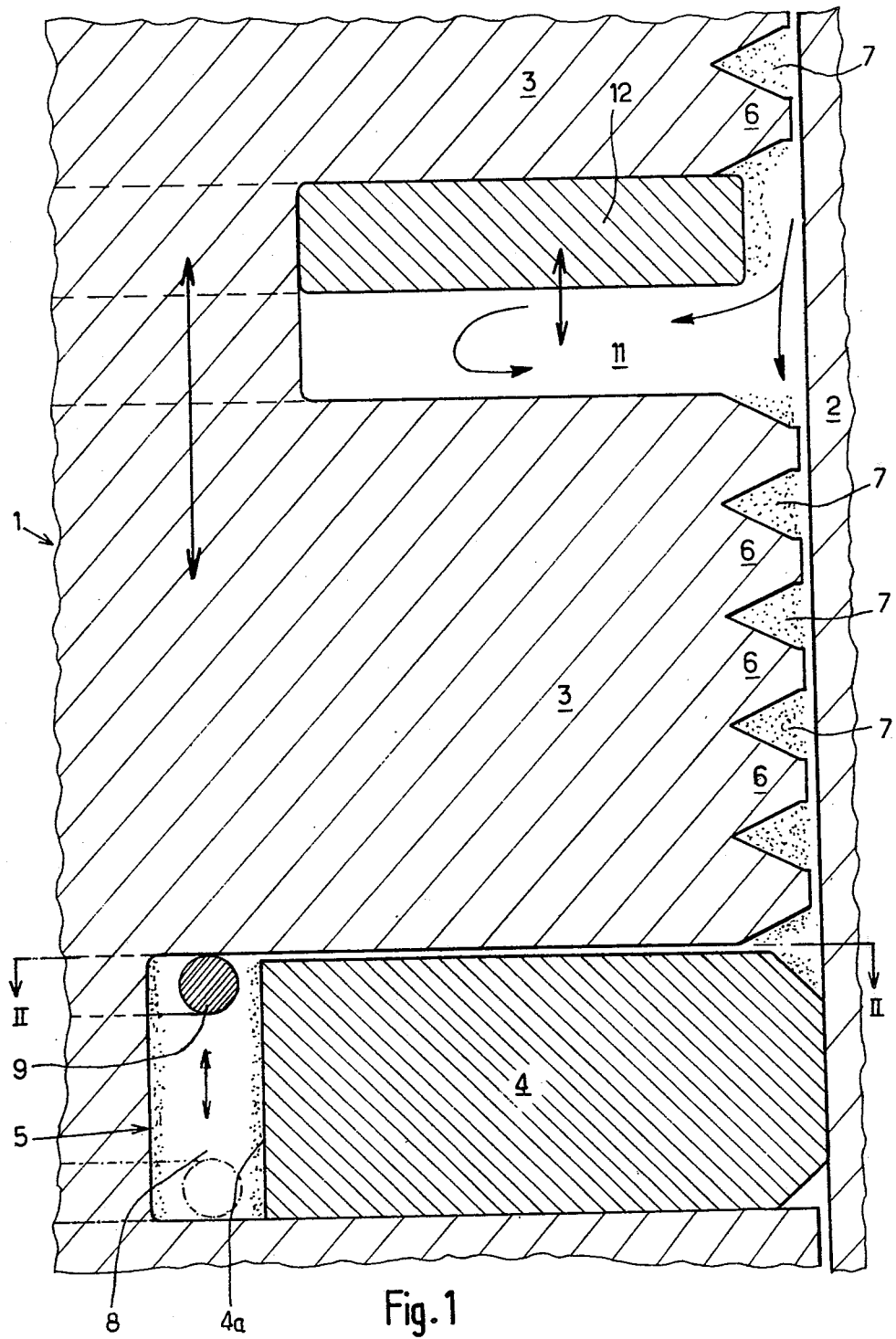
FIG. 1 is a view in partial longitudinal section of a piston according to the invention animated by a reciprocating movement in a cylinder.
Figure 2:
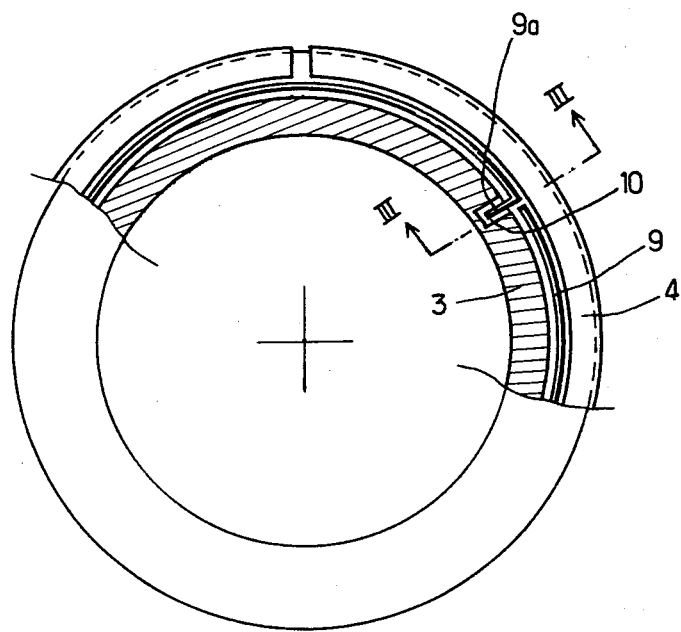
FIG. 2 is a view in partial transverse section, on a smaller scale made along the line II—II of FIG. 1.
Figure 3:
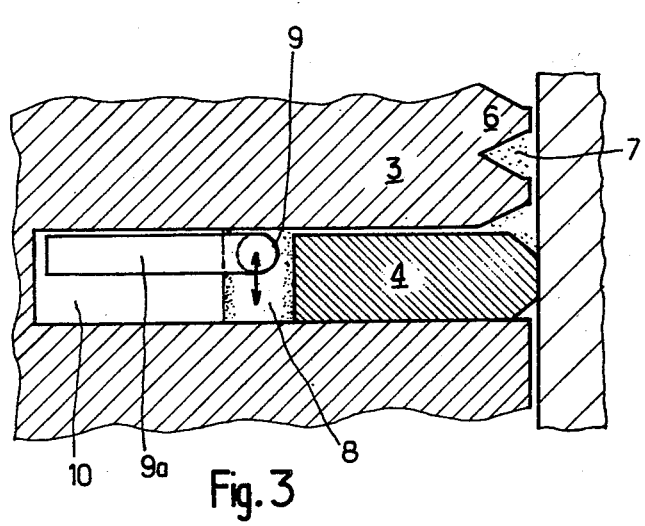
FIG. 3 is a view in partial section, on a larger scale, made along the line III—III of FIG. 2.

Referring now to drawings, FIGS. 1 to 3 partially show a piston 1 according to the invention after a long period of running-in and at an average operating temperature. This piston is in the upward stroke of its vertical reciprocating movement, i.e. before explosion in the upper combustion chamber, in other words in compression phase of the driving fluids. This piston is shown by a part of its upper bead 3 and it is animated by a reciprocating movement inside a cylinder 2 shown partially. Beneath the first upper bead 3 is partially shown the first ring 4 of the piston, this ring being housed in a transverse annular groove 5.

The piston 1 presents on its periphery alternating projecting parts 6 and recessed parts 7. The parts 6 may be constituted by threads of trapezoidal cross section, separated by grooves 7 of triangular cross section constituting the recessed parts. Conventional deposits of carbon (indicated by dots in the figure) are formed in these grooves. The threads 6 and grooves 7 may be obtained by a conventional threading operation carried out on the periphery of the first bead 3.

Whilst on conventional reciprocating pistons the beads have such dimensions that they must never come into contact with the wall of the cylinders, the piston 1 according to the invention is chosen so that the periphery of the first bead 3 has an initial diameter when cold, before running-in, such that the diametrical clearance between piston and cylinder at this spot of the bead 3 is substantially equal to half the clearance usually provided in the corresponding case of a conventional piston.

The periphery of the bead 3 shown in FIG. 1 is that of a first piston bead which has formed itself, particularly by compression of the apices of the teeth constituting the projecting parts 6, this first bead being pressed with driving fluids against the inner wall of the cylinder 2, mainly in the course of multiple expansions of this first bead during the running-in period. This results in the clearance between the apices of the projecting parts or teeth 6 and the inner wall of the cylinder 2 being, at average operating temperature, only about one third of the normal clearance between the cylinder and the first bead of a conventional piston in the same conditions. For example, in the case of a reciprocating piston of 75 mm diameter mounted in a four-stroke engine, a first self-adapted bead of a piston according to the invention has, on average, a diameter larger than that of a conventional piston by 0.2 mm. The diametrical clearance of this auto-adapted bead is thus between 0.3 mm when cold and 0 under the maximum conditions of expansion of the bead.

The piston according to the invention thus presents, above its first ring 4, between its periphery and the inner wall of the cylinder, a channel of which the small maximum width is obtained more or less rapidly, during running-in, as a function of the malleability of the projecting parts 6 which are provided to be more or less large, resistant or other according to the rapidity of the desired running-in.

The piston according to the invention also comprises a decompression chamber 8 which is delimited between the bottom of the annular groove 5 and the inner face 4a of the first ring 4 housed in said groove. In this decompression chamber 8 is housed a movable piece 9 which is advantageously constituted by a split ring of small cross section (having a diameter ranging from 0.3 to 0.5 mm).

The role of the mobile ring 9 is to maintain constant the volume of the decompression chamber 8 by opposing the formation of carbon. In fact, this ring 9 moves axially in reciprocating manner, between the upper and lower faces of the grooves 5, during the reciprocating movement of the piston, and it also moves slightly in the radial direction.

The presence of the mobile ring 9 in the decompression chamber 8 avoids the formation of carbon at the rear of the ring 4. In fact, in a conventional piston, the deposits of carbon in the chamber 8 tend to be partially or momentarily limited further to the movement of balancing of the piston about its transverse pivoting axis. In the case of the piston according to the invention, as the periphery of the upper bead 3 is self-adapted to the inner wall of the cylinder 2, the movement of balancing is virtually zero and if the mobile ring 9 were not provided, a slower, but more considerable formation of carbon in the chamber 8 would result, this deposit of carbon being able, in turn, to provoke a jamming of the ring 4 between its support faces in the case of a considerable expansion of the piston, at high rate. The mobile ring 9 therefore enables this danger to be avoided.

According to a particular, non-limiting embodiment of the ring 9 said latter may comprise, at one of its ends, a branch 9a bent substantially radially inwardly. This end branch 9a is engaged in a radial hole 10 made in the piston. In this way, the split ring 9 is maintained in position in the circumferential direction.

In addition, the piston according to the invention may comprise, in the periphery of the first bead 3, above the ring 4, another decompression chamber 11 in which is housed a piece 12 which moves freely therein due to the movement of the piston. The cavity constituting the decompression chamber 11 is constituted by an annular transverse groove in which is housed a split ring 12 comparable with a shim or a flat part of a spring scraper.

The upper decompression chamber 11 which is located on the path of the driving fluids in the direction of the first ring 4 or coming therefrom, contributes to additionally limiting the negative action of the driving fluids at the level of this first ring. In this chamber, the volume is maintained permanent by the reciprocating motion of the ring 12 which is provided to prevent in this chamber 11, any deposit of carbon without any other decompression. The reciprocating motion of the ring 12 against the bottom of the cavity 11, between the top and bottom thereof is provoked by the combination of the movements of the piston with those of the driving fluids. Of course, further to the frequent variation of the clearance between piston and cylinder, whilst the engine is in operation, the free volume of the cavity 11 constituted a regulator of which the efficiency is particularly beneficial, at the level of the first ring 4, when the engine is started up, when operating at low temperatures and generally at all moments when the loads of the engine vary.

The self adaptable periphery of the bead 3 may, after being determined, i.e. when it is definitively adapted to its cylinder after an efficient running-in, furnish very precise dimensions enabling the self-adaptation time of the periphery of the piston to be limited according to need. For example, due to modern copying machines, it is then easy to reproduce the shape and dimensions of a self adapted periphery of a piston on the corresponding peripheries of other pistons being manufactured, with all the necessary safety tolerances as a function in particular of the different minima between the adapted peripheries of the pistons of the same type of engine, and even of the same engine.

The results of comparative tests will be given herein below, said tests having been made with a Renault R5 TL passenger car, which was equipped new with pistons according to the invention and which had covered 33,000 kms when the tests were carried out. The piston 1 with which this car is provided is housed in 65 mm diameter bore and it has a stroke of 72 mm. The piston 9 had, when cold, a diametrical clearance of 0.20 mm at the first and second beads, this clearance being about 0.30 mm after the running-in period as shown schematically in FIG. 1.

The piston according to the invention was fluted by means of a knurling tool so as to present on the lateral surface of its first and second beads parallel and adjacent flutes with cross section in the form of an isosceles triangle, the distance between the edges of the adjacent triangular flutes being 0.5 mm and the depth of each groove between two adjacent flutes also being 0.5 mm. These triangular flutes were transformed, at the end of the running-in period, into substantially trapezoidal sections such as those of the projecting parts 6 of FIG. 1. The piston according to the invention mounted on the Renault car subjected to the tests also comprised a ring 9 having a circular cross section of diameter 0.3 mm and the clearance, when cold, between the inner face 4a of the first ring 4 and the bottom of the annular groove 5 was of the order of 0.5 to 0.6 mm.

The following Table gives the numerical results of the comparative tests which were carried out. Columns A, B, C indicate results obtained with a Renault R5 TL car equipped with conventional pistons, whilst column D gives the results obtained with the same car equipped with pistons according to the invention. Column A corresponds to tests made by the Union Technique de l'Automobile et du Cycle, offical test centre, column B gives the results supplied by the marker, i.e. Renault, whilst column C indicates the results of tests published in the Journal "l'Automobile" in December 1978.

| | A | B | C | D |
|---|---|---|---|---|
| Maximum Speed | | | | |

-continued

|  | A | B | C | D |
|---|---|---|---|---|
| (in km/hr) |  |  |  |  |
| in 4th gear |  | 135 | 129,5 | 139,6 |
| ACCELERATIONS |  |  |  |  |
| 1000m from |  |  |  |  |
| stationary position |  |  | 41"1 | 39"8 |
| from 0 to 100 km/hr |  |  |  | 17"2 |
| PICK-UPS |  |  |  |  |
| 1000m from 40 |  |  | 42"9 | 40"38 |
| 80 to 100 in 3rd gear |  |  |  | 5"2 |
| in 4th gear |  |  |  | 7"36 |
| 80 to 120 in 4th gear |  |  |  | 19"8 |
| CONSUMPTION |  |  |  |  |
| (in liters/100 km) |  |  |  |  |
| Speed |  |  |  |  |
| 90 km/hr stabilised | 6,1 | 6,1 | 6,70 | 5,96 |
| 120 km/hr stabilised | 8,6 | 8,6 | 9,90 | 8,45 |
| at maximum speed |  |  | 10,80 | 10,33 |
| (speed in km/hr) |  |  | 129,5 | 139,6 |
| on the highway |  |  |  |  |
| (speed limit: 90 km/hr) |  |  | 6,66 | 6,46 |
| (average km/hr) |  |  |  |  |
| on the motorway |  |  |  |  |
| (speed limit: 130 km/hr) |  |  | 8,93 | 9,34 |
| (average km/hr) |  |  | 123,3 | 129,13 |
| in town |  |  | 7,8 | 7,26 |
| (average km/hr) |  |  | 22,0 | 25,08 |

The above table shows that use of pistons according to the invention enables a substantial increase of the maximum speed (139,6 km/hr), greater accelerations, better pick-ups and a lower consumption of fuel, to be obtained. The only increase in consumption (9.34 liters/100 km on motorway) must be compared with the increase in the average speed made (129.13 km/hr instead of 123.3 km/hr.).

It is therefore seen from the foregoing that the piston according to the invention enables the yield of an internal combustion engine, of similar consumption, to be substantially improved and the fuel consumption at equal speeds to be reduced.

What I claim is:

1. A reciprocating piston for heat engines, compressors, and other like industrial machines having a cooperating piston and cylinder, comprising:
   a piston body having a longitudinal axis and including an upper bead, said piston body being provided in a direction radially transverse to said longitudinal axis with a transverse annular groove having an inner portion and a radial hole extending radially inwardly from said inner portion of said annular groove;
   a first ring housed in said transverse annular groove having a rear inner facing surface spaced from said inner portion of said transverse annular groove;
   at least one decompression chamber formed in said transverse annular groove between said rear inner facing surface of said first ring and said inner portion of said transverse inner groove; and
   a movable split ring housed in said decompression chamber formed in said transverse annular groove, said split ring being continuous between split ends thereof, said split ring having at one of its ends thereof a branch bent substantially radially inwardly engaged within said radial hole for maintaining said split ring in a circumferential direction axially of said longitudinal axis of said piston body for permitting said ring to have radial and axial movement;
   said upper bead having on its periphery projecting ribs and recessed portions spaced from the inner wall of its said cooperating cylinder, said projecting ribs alternating with said recessed portions;
   said projecting ribs having a diameter related to the diameter of the inner wall of said cylinder such that the initial diametrical clearance between said outer rib periphery axially of said piston in its cold condition and said inner wall periphery of said cylinder is substantially equal to half the clearance usually provided with a conventional piston and said inner wall of said cylinder such that during running-in said projecting ribs are pressed against the inner wall of said cylinder whereby said projecting ribs may become compressed and contract so that said recessed portions absorb such compressions by lubricating said projecting ribs with driving fluid that they retain.

2. A reciprocating piston for heat engines, comressors, and other like industrial machines having a cooperating piston and cylinder, comprising:
   a piston body including an upper bead and having a longitudinal axis in a direction of reciprocation thereof, said piston body being provided with a transverse annular groove having an inner portion and upper and lower faces in a direction axially of the longitudinal axis, and a radial hole means defined in said inner portion;
   a first ring housed in said transverse annular groove having a rear inner facing surface spaced from said inner portion of said transverse annular groove;
   at least one decompression chamber formed in said transverse annular groove between said rear inner facing surface of said first ring and said inner portion of said transverse inner groove; and
   a transversely and radially movable split ring housed in said decompression chamber formed in said transverse annular groove and movable axially therein in a reciprocating manner between said upper and said lower faces, said split ring being continuous between the split ends thereof and having a deformation at any point of its periphery for engagement with said radial hole means in the inner portion of said transverse annular groove for maintaining said split ring in a circumferential position, said split ring being dimensioned to remain free in said decompression chamber whatever the conditions of operation of said piston and to maintain the volume of said chamber constant at equal temperature by opposing the formation of carbon by its movements consecutive to the movements of said piston;
   said upper bead having on its periphery projecting ribs and recessed portions spaced from the inner wall of its said cooperating cylinder, said projecting ribs alternating with said recessed portions;
   said projecting ribs having a diameter related to the diameter of the inner wall of said cylinder such that the initial diametrical clearance between said outer rib periphery axially of said piston in its cold condition and said inner wall periphery of said cylinder is substantially equal to half the clearance usually provided with a conventional piston and said inner wall of said cylinder such that during running-in said projecting ribs are pressed against the inner wall of said cylinder whereby said projecting ribs may become compressed and contract so that said recessed portions absorb such compressions by lubricating said projecting ribs with driving fluid that they retain.

3. The reciprocating piston as claimed in claim 1 or 2, wherein said upper bead is provided with another transverse annular groove forming therein a second decompression chamber; and another movable ring piece housed within said second decompression chamber, free of engagement with said cylinder, and freely movable axially therein to cooperate with said first ring in response to the movement of said piston in said cylinder, and said other ring piece is a split ring in the form of a scraper.

4. The reciprocating piston as claimed in claim 3, wherein said second decompression chamber is located in the path of driving fluids in the direction of said firt ring, and said other movable ring piece is movable in a reciprocating direction axially of said housing in said second decompression chamber for maintaining the volume thereof constant to prevent any deposit of carbon in said second decompression chamber.

5. A reciprocating piston for heat engines, compressors, and other like industrial machines having a cooperating piston and cylinder, comprising:

a piston body having a longitudinal axis in a direction of reciprocation thereof and including an upper bead, said piston body being provided with a transverse annular groove having an inner portion and upper and lower faces in a direction axially of said longitudinal axis;

a first ring housed in said transverse annular groove having a rear inner facing surface spaced from said inner portion of said transverse annular groove;

said upper bead having on its periphery projecting ribs and recessed portions spaced from the inner wall of its said cooperating cylinder, said projecting ribs alternating with said recessed portions;

at least one decompression chamber formed in said transverse annular groove between said rear inner facing surface of said first ring and said inner portion of said transverse inner groove; and a movable continuous ring having a single split forming a single pair of split ends housed in said decompression chamber formed in said transverse annular groove and movable axially therein in a reciprocating manner between said upper and said lower faces and radially relative to said longitudinal axis, said split ring being continuous between the split ends thereof having a circular cross-section with a diameter of from 0.3 to 0.5 mm, such that said diameter of said cross-section is substantially equal to one quarter of the usual initial diametrical clearance between said inner facing surface and said inner portion but always dimensioned to remain free in said decompression chamber whatever the conditions of operation of said piston and to maintain the volume of said chamber constant at equal temperature by opposing the formation of carbon by its movements consecutive to the movements of said piston, means interposed between said split ring and said transverse annular groove to maintain said split ring in a circumferential direction;

said projecting ribs having a diameter related to the diameter of the inner wall of said cylinder such that the initial diametrical clearance between said outer rib periphery axially of said piston in its cold condition and said inner wall periphery of said cylinder is substantially equal to half the clearance usually provided with a conventional piston and and said inner wall of said cylinder such that during running-in said projecting ribs are pressed against the inner wall of said cylinder whereby said projecting ribs may become compressed and contract so that said recessed portions absorb such compressions by lubricating said projecting ribs with driving fluid that they retain.

6. The reciprocating piston as claimed in claim 5, wherein:

said upper bead is provided with another transverse annular groove forming a second decompression chamber;

a movable ring piece housed within said second decompression chamber, free of engagement with said cylinder, and freely movable axially therein to cooperate with said first ring in response to the movement of said piston in said cylinder.

* * * * *